United States Patent [19]
Riley

[11] Patent Number: 6,129,067
[45] Date of Patent: Oct. 10, 2000

[54] ROTARY ENGINE

[76] Inventor: Thomas Riley, 314 Wright St., Unit 206, Lakewood, Colo. 80228

[21] Appl. No.: 08/969,352

[22] Filed: Nov. 28, 1997

[51] Int. Cl.[7] ...................................................... F02B 53/00
[52] U.S. Cl. ........................................... 123/246; 123/232
[58] Field of Search ..................................... 123/208, 232, 123/246

[56] References Cited

U.S. PATENT DOCUMENTS

| | | | |
|---|---|---|---|
| 1,229,949 | 6/1917 | Harrigan . | |
| 2,870,752 | 1/1959 | Breelle | 123/246 |
| 2,920,610 | 1/1960 | Breelle . | |
| 3,297,006 | 1/1967 | Marshall | 123/208 |
| 3,435,808 | 4/1969 | Allender . | |
| 3,640,252 | 2/1972 | Spinnett . | |
| 3,990,409 | 11/1976 | Beverly | 123/246 |

FOREIGN PATENT DOCUMENTS

| | | | |
|---|---|---|---|
| 1372782 | 8/1964 | France | 123/232 |
| 118424 | 8/1918 | United Kingdom | 123/232 |

*Primary Examiner*—Michael Koczo
*Attorney, Agent, or Firm*—Michael I. Kroll

[57] ABSTRACT

An improved rotary engine (12), wherein the improvement comprises a facility (58) for transferring any remaining exhaust gases from a first center well (16) in a housing (14) of the engine (12) into a cavity (34) of a second rotor (32) in a second well (18) in the housing (14) during the expansion cycle. An assembly (62) is for purging any remaining exhaust gases from the cavity (34) of the second rotor (32) in the second well (18) back into an air intake port (44) in the housing (14). An assembly (70) is for ejecting the compression of any fresh air and trapped exhaust gases into an exhaust port (48) in the housing (14) during the meshing of a piston (28) on a first rotor (26) in the first center well (16), with a cavity in a third rotor (38) in a third well (22) in the housing (14). A unit (78) is for drawing fresh air from the air intake port (44) into the cavity (40) in the third rotor (38), when the piston (28) of the first rotor (26) starts to exit from the cavity (40) in the third rotor (38).

16 Claims, 11 Drawing Sheets

ROTARY ENGINE

BACKGROUND OF THE INVENTION

1. Field of the Invention

The instant invention relates generally to rotary engines and more specifically it relates to an improved rotary engine. The improved rotary engine utilizes four performance enhancers that can power transportation, recreational, agricultural and power equipment in a more efficient manner.

2. Description of the Prior Art

Numerous rotary engines have been provided in prior art. For example, U.S. Pat. No. 1,229,949 to Harrigan; U.S. Pat. No. 2,920,610 to Breelle; U.S. Pat. No. 3,435,808 to Allender and U.S. Pat. No. 3,640,252 to Spinnett all are illustrative of such prior art. While these units may be suitable for the particular purpose to which they address, they would not be as suitable for the purposes of the present invention as heretofore described.

HARRIGAN, EDWARD

ROTARY ENGINE

U.S. Pat. No. 1,229,949

A gas engine having rotative piston and abutment members, a casing having chambers for the members, a primary expansion chamber, an ignition chamber and an exhaust chamber. Channels connect the expansion and exhaust chambers with the piston chamber and a valve in each of the channels.

BREELLE, YVES

ROTARY INTERNAL COMBUSTION ENGINE

U.S. Pat. No. 2,920,610

A multi-cycle rotary internal combustion engine comprising a central cylindrical rotor having a plurality of identical longitudinally extending lobes spaced uniformly about the circumference of the rotor. A plurality of peripheral rotors comprising alternately at least one sealing and at least one combustion rotor. The rotors are disposed around the center rotor for cooperation therewith and are rotatable about axes parallel to the axis of the central rotor. Each of the peripheral rotors having in its cylindrical surface longitudinally extending peripheral wells. Each of the wells having a volume and shape just sufficient to permit passage of the lobes of the central rotor therethrough. The combustion rotor having in its interior at least two combustion chambers disposed eccentrically relative to the axis of the combustion rotor. Passageways are in the combustion rotor, each of which connects one of the eccentrically disposed combustion chambers to one of the wells in the combustion rotor in such a manner that it extends from the combustion chamber to the well in a direction substantially opposed to the sense of rotation of the combustion rotor. A casing having interacting parallel cylindrical bores in which the respective rotors rotate. Gear means are for rotating the peripheral rotors in synchronism with the central rotor, so that each of the lobes on the central rotor successively passes through wells of the successive ones of the peripheral rotors. Labyrinth-type sealing means are provided on the rotors, the lobes and wells having a shape and size to effect a sealing free from mechanical friction between opposite sides of each of the lobes with opposite sides of the corresponding well as the lobe passes through the well.

ALLENDER, FORREST R.

ROTARY ENGINE

U.S. Pat. No. 3,435,808

A rotary internal combustion engine comprising a power wheel having two lobes projecting outwardly from diametrically opposed positions on the power wheel. A pair of compression chamber wheels are disposed on diametrically opposite sides of the power wheel. Each compression chamber wheel has two chambers provided therein and the lobes are movable through the chambers. The lobes and chambers are shaped so that a compression zone is formed between the tip of the lobe and the leading end of the chamber and a combustion zone is formed between the tip of the lobe and the trailing end of the chamber. Transfer passage means are provided for transferring compressed gas from the compression zone to the combustion zone, so that the gas can be ignited in the combustion zone.

SPINNETT, RAYMOND G.

ROTARY INTERNAL COMBUSTION ENGINE

U.S. Pat. No. 3,640,252

A rotary energy converter or engine, for converting fuel combustion into rotary mechanical motion, has a casing providing three annular chambers in which three rotors are mounted for timed rotation. The central rotor has pistons extending axially from one face of a rotor disc, which rotate in the central chamber and which juxtapose at timed periods with abutments on the two noncentral rotors to form momentary function-chambers that permit concurrent phases of intake, compression, power and exhaust functions to occur. The sealing between adjacent function-chambers is accomplished without physical contact of moving parts and especially without the need for minute clearance tolerances and without the need for precision gearing. Recirculation of combusted gases and recirculation of portions of fresh air-exhaust mixtures diminish undesirable emission products. An internal cooling system dissipates heat while another internal venting system entraps leakage gases for further combustion. The form of the juxtaposed pistons and abutments are simplified due to the relative configuration of chambers, pistons and abutments being made to permit circular approximations instead of requiring the perfection of a complex curvature form. The basic reference for the various relative configurations is the minor radius of the central annular chamber which is made equal to the major radius of the noncentral annular chambers.

SUMMARY OF THE INVENTION

In order to overcome unwanted effects of a four cycle engine, the instant invention being an improved rotary engine contains four efficient performance enhancers, which provide a more efficient and productive means of operating a four cycle none offset rotational rotary engine.

A primary object of the present invention is to provide an improved rotary engine that will overcome the shortcomings of the prior art devices.

Another object is to provide an improved rotary engine having four performance enhancers that will in effect allow the engine to function in an efficient safe manner.

An additional object is to provide an improved rotary engine that can perform in almost any position with a gravitational force.

A still additional object is to provide an improved rotary engine having four performance enhancers which will increase speed and relative load from the engine herein.

A further object is to provide an improved rotary engine having four durable performance enhancers that are simple and easy to use.

A still further object is to provide an improved rotary engine that is economical in cost to manufacture and being a more environmentally friendly engine.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
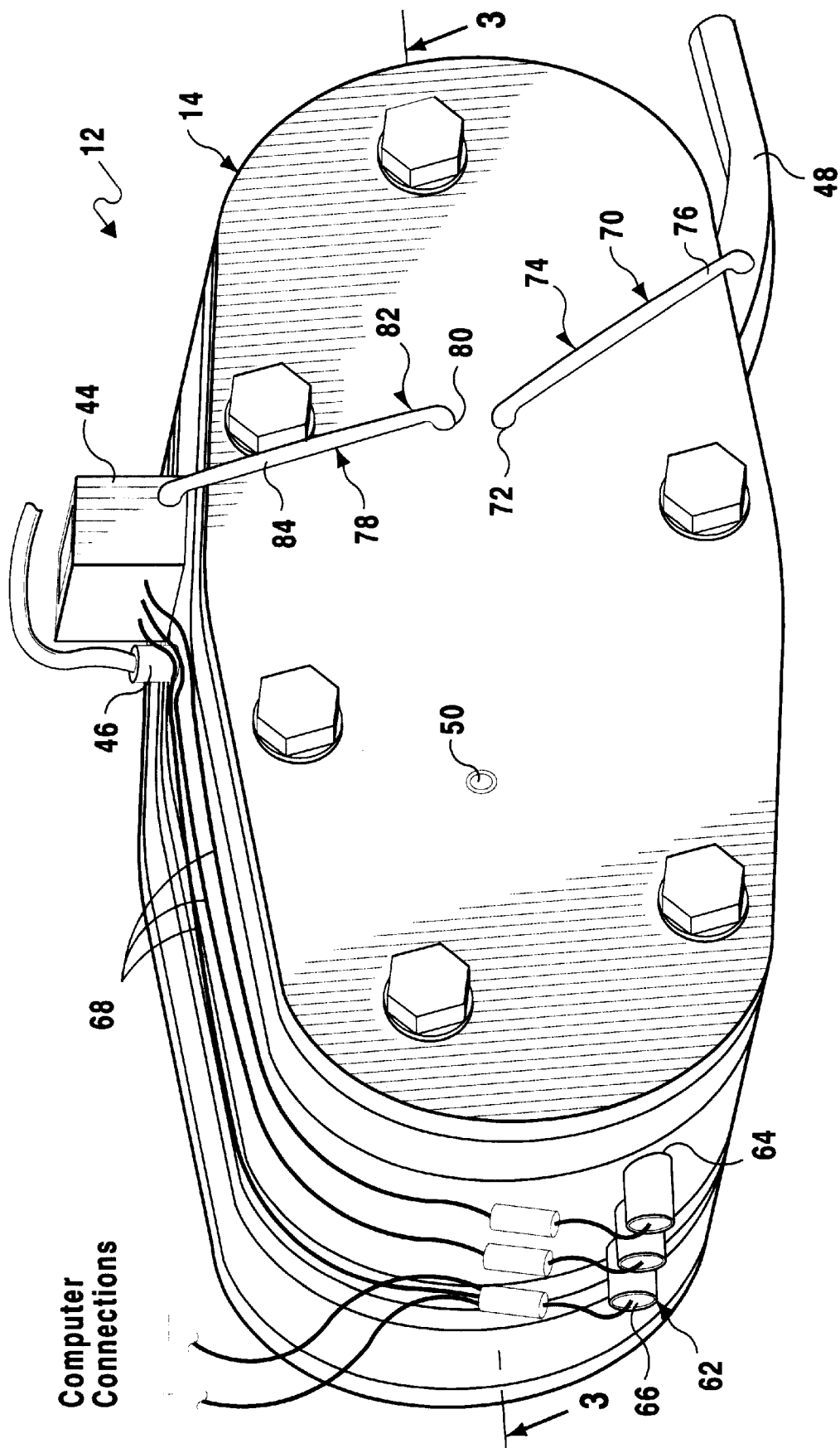
FIG. 1 is a perspective view of the present invention, showing the location of the exhaust gases recycling solenoids, the scavenger pump intake tube and the scavenger pump exhaust tube thereon.
Figure 2:
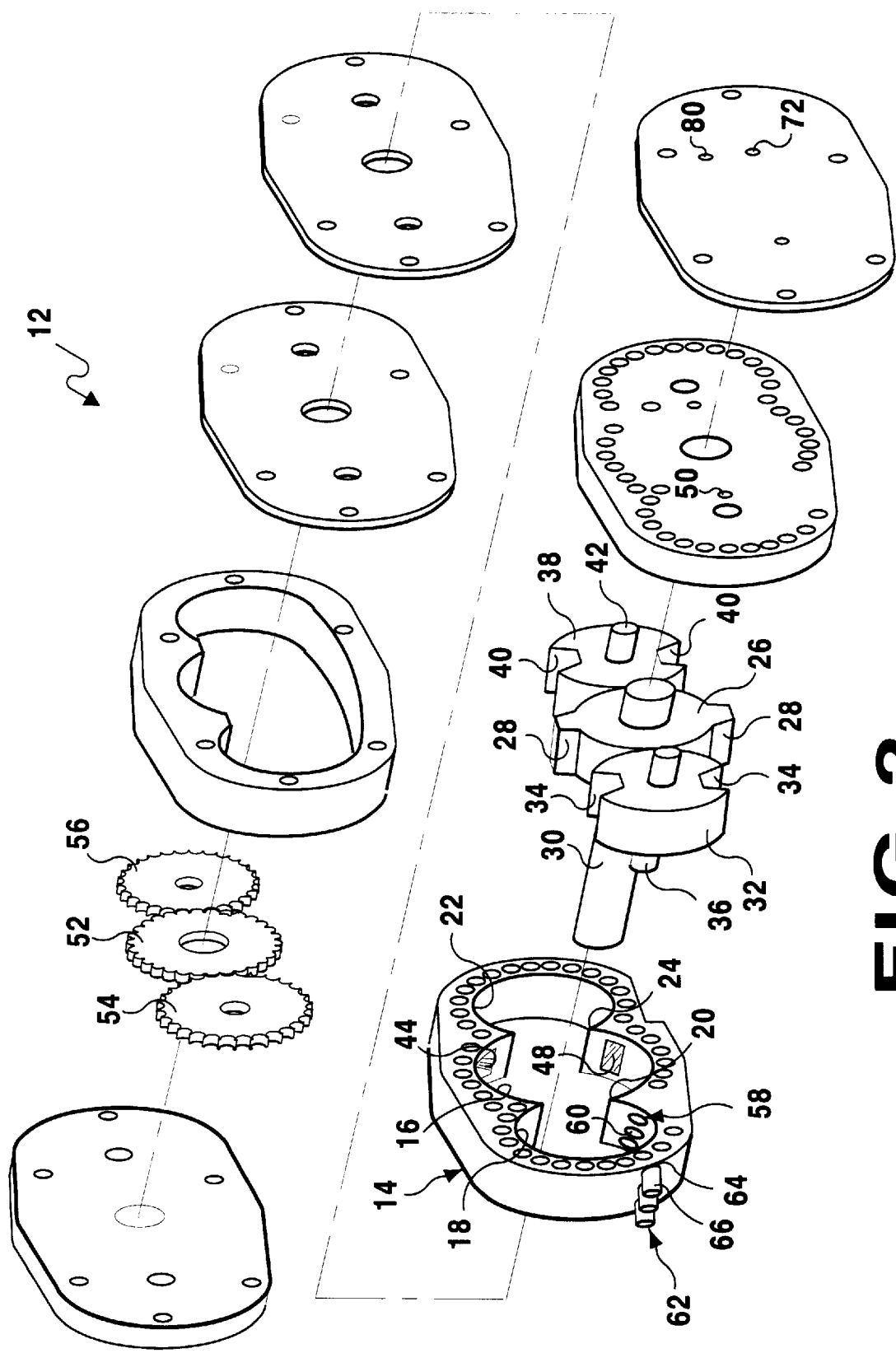
FIG. 2 is an exploded perspective view, showing the location of the expansion exchange tubes therein.
Figure 3:
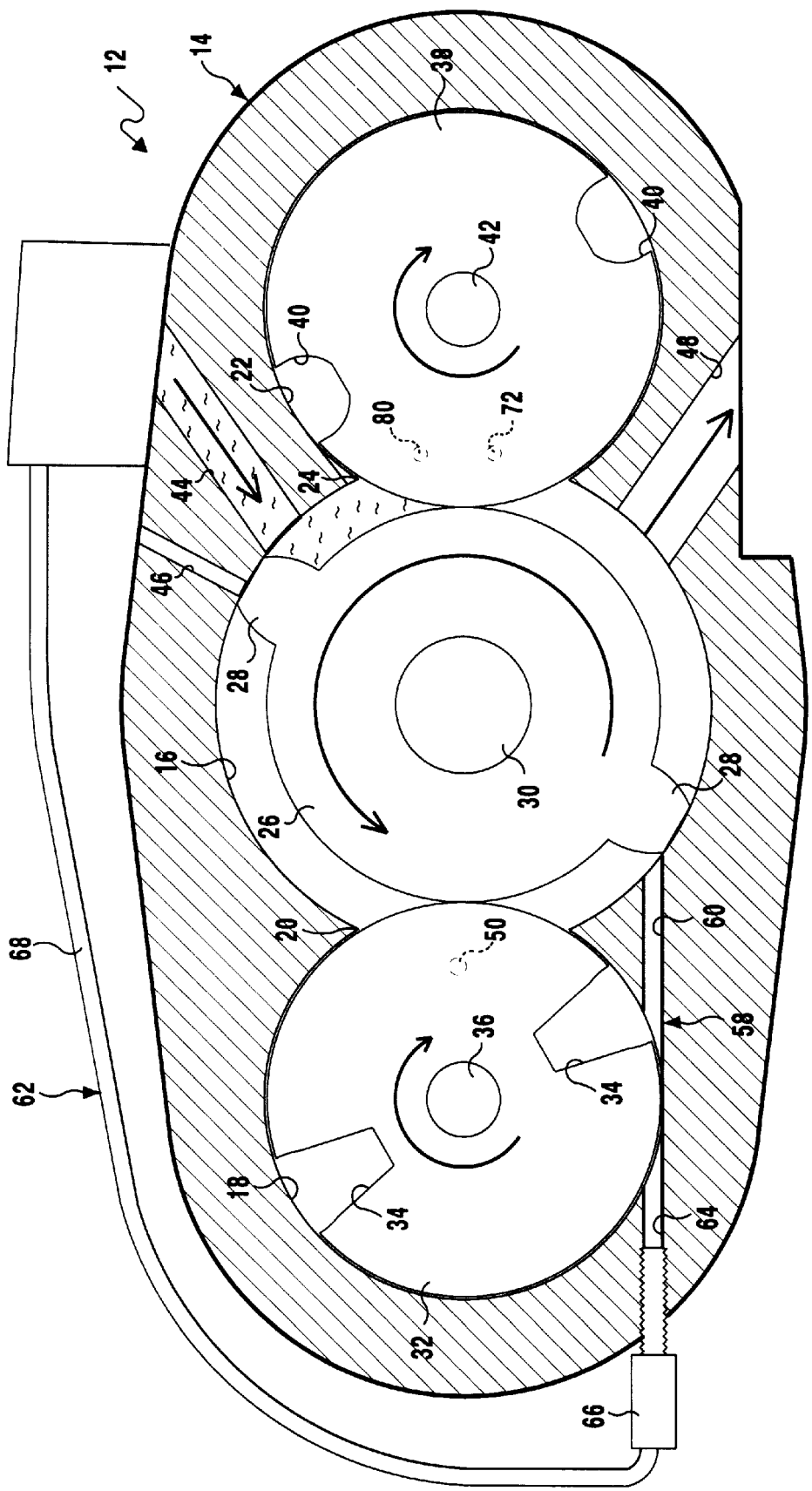
FIG. 3 is a diagrammatic cross sectional view taken generally along line 3—3 in FIG. 1, showing the position of the rotors at the beginning of the air intake cycle.
Figure 4:
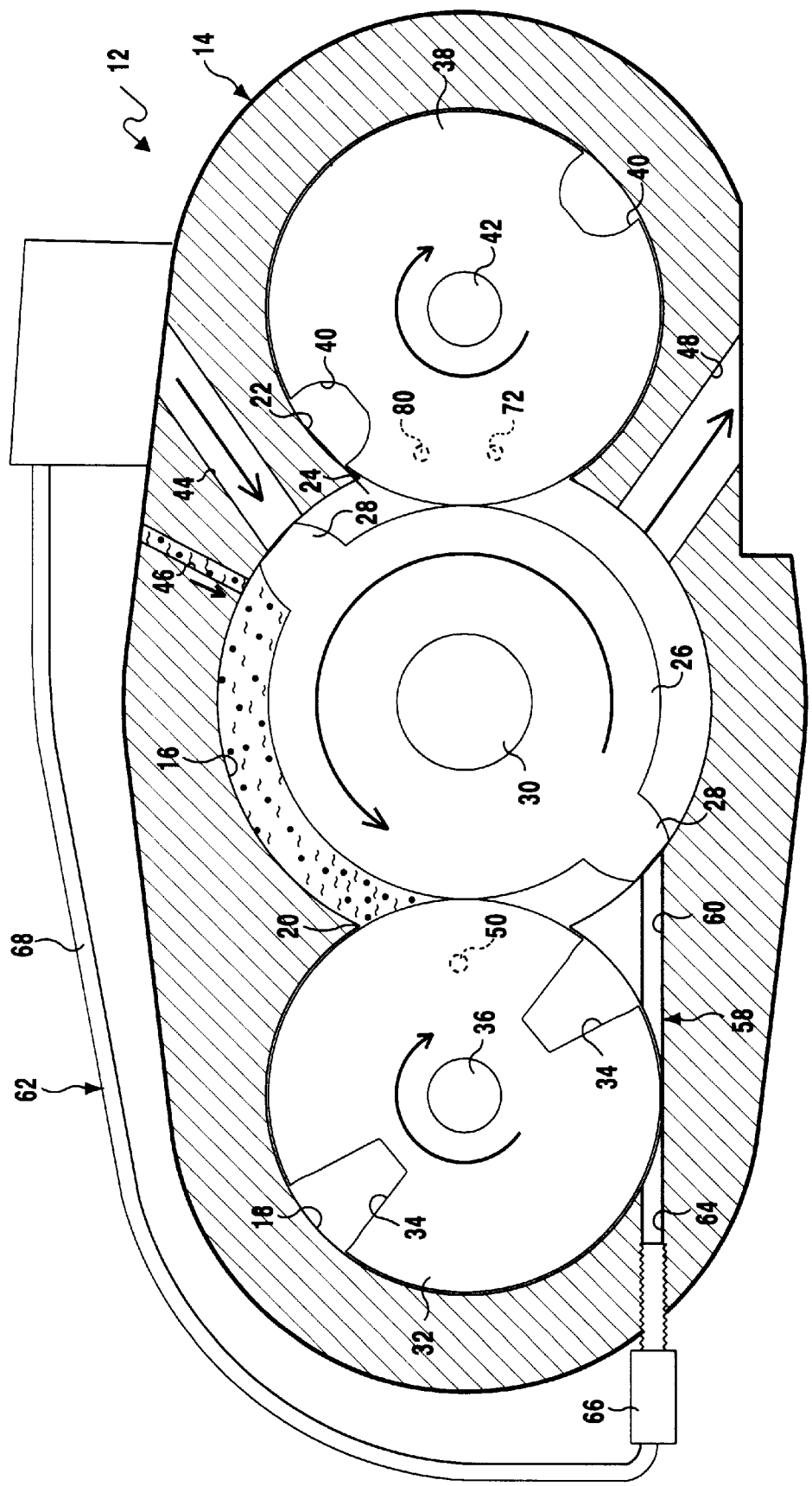
FIG. 4 is a diagrammatic cross sectional view similar to FIG. 3, showing the position of the rotors at the beginning of the compression cycle with introduction of the fuel air mixture.
Figure 5:
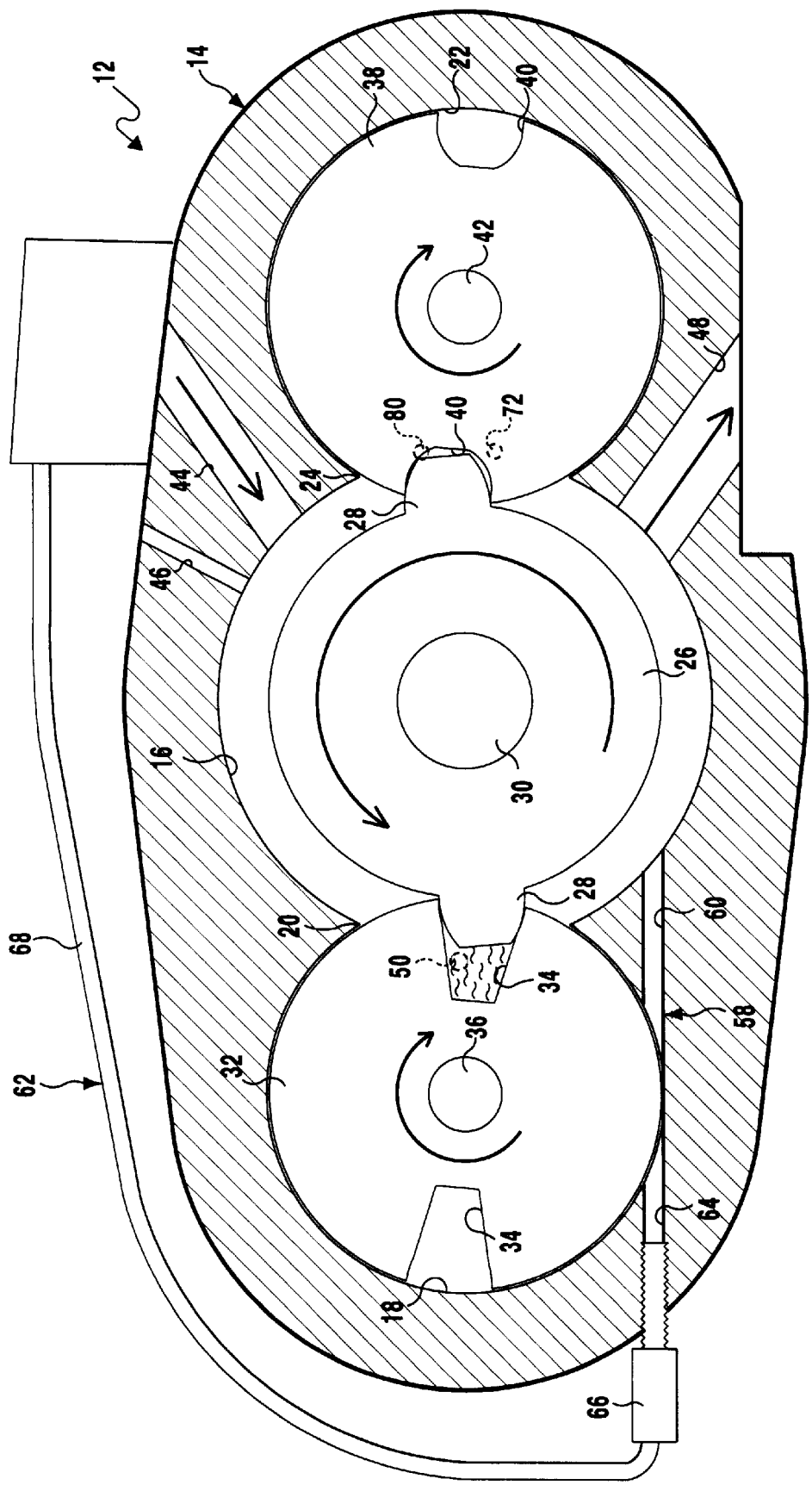
FIG. 5 is a diagrammatic cross sectional view similar to FIG. 4, showing the position of the rotors at the beginning of the expansion cycle with spark ignition occurring.

Turning now descriptively to the drawings, in which similar reference characters denote similar elements throughout the several views, FIGS. 1 through 11 illustrate the present invention being an improved rotary engine 12. With regard to the reference numerals used, the following numbering is used throughout the various drawing figures.

The improved rotary engine 12 is of the type having a housing 14 with a first center well 16, a second well 18 communicating with a first side 20 of the first center well 16 and a third well 22 communicating with a second side 22 of the first center well 16. A first rotor 26 with two evenly spaced apart pistons 28 on a first output shaft 30 is rotatably mounted in the first center well 16. A second rotor 32 has two evenly spaced apart cavities 34 on a second alignment shaft 36 rotatably mounted in the second well 18. A third rotor 38 has two evenly spaced apart cavities 40 on a third alignment shaft 42 and is rotatably mounted in the third well 22.

An air intake port 44 in the housing 14 communicates with the first center well 16 adjacent to the second side 24 thereof. A fuel injection port 46 in the housing 14 communicates with the first center well 16 adjacent to the air intake port 44. An exhaust port 48 communicates with the first center well 16 adjacent to the second side 24 thereof opposite from the air intake port 44. A fuel firing spark plug 50 communicates with the second well 18 adjacent to the first side 20 of the first center well 16. Three gears 52, 54 and 56 are for operatively connecting the three shafts 30, 36 and 42 together for holding the pistons 28 of the first rotor 26 in the first center well 16 in mesh with the cavities 34 and 40 in the second and third rotors 32 and 38.

Figure 6:
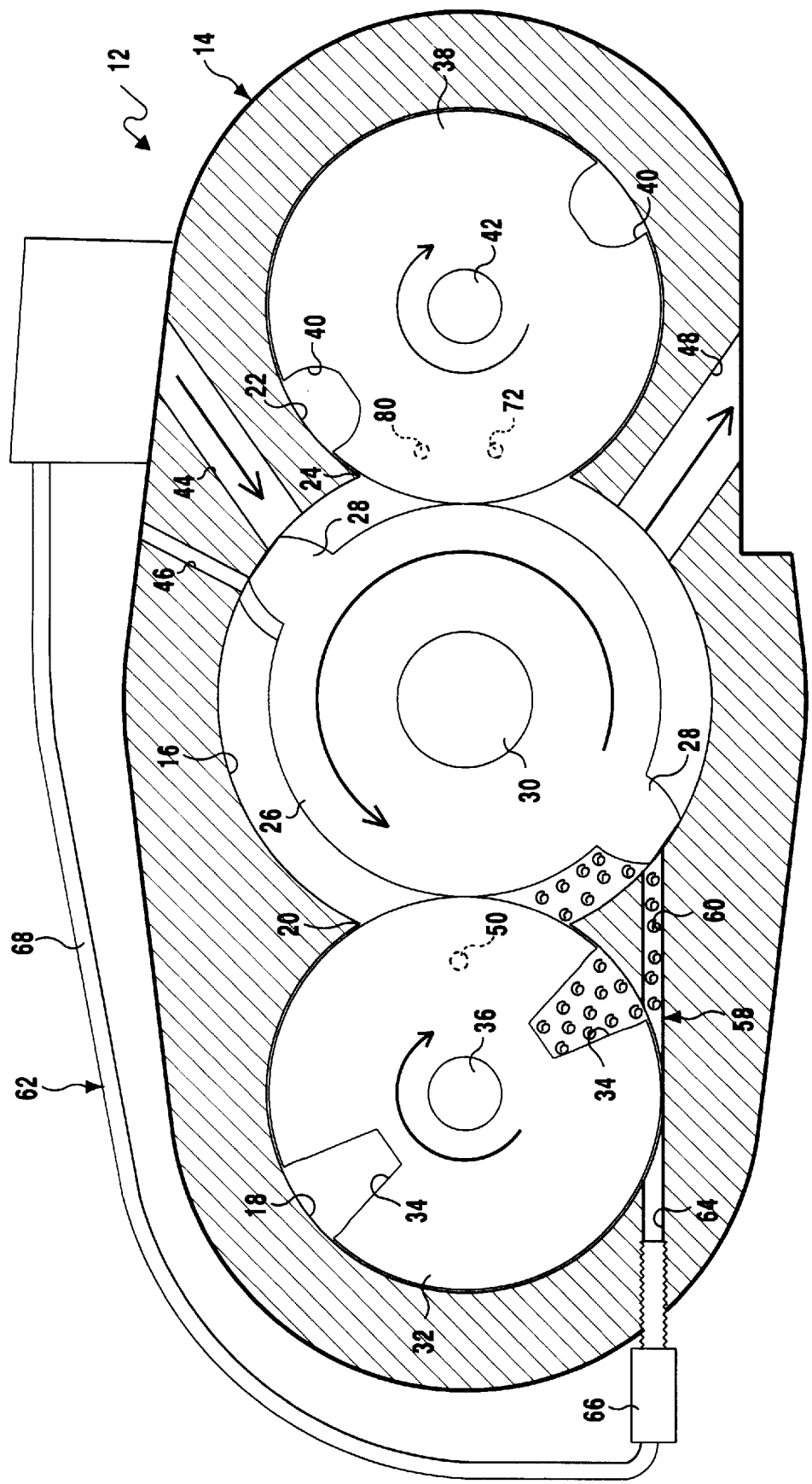
FIG. 6 is a diagrammatic cross sectional view similar to FIG. 5, showing the position of the rotors at the beginning of the expansion exchange tubes function.

The improvement comprises a facility 58 for transferring any remaining exhaust gases from the first center well 16 into a cavity 34 of the second rotor 32 in the second well 18 during the expansion cycle, which will prevent the introduction of the exhaust gases into the next combustion cycle which would reduce the efficiency of the rotary engine 12 (see FIG. 6). The transferring facility 58 includes a plurality of expansion exchange tubes 60 in the housing 14 communicating between the first center well 16 and the second well 18 on the first side 20 opposite from the air intake port 44.

Figure 7:
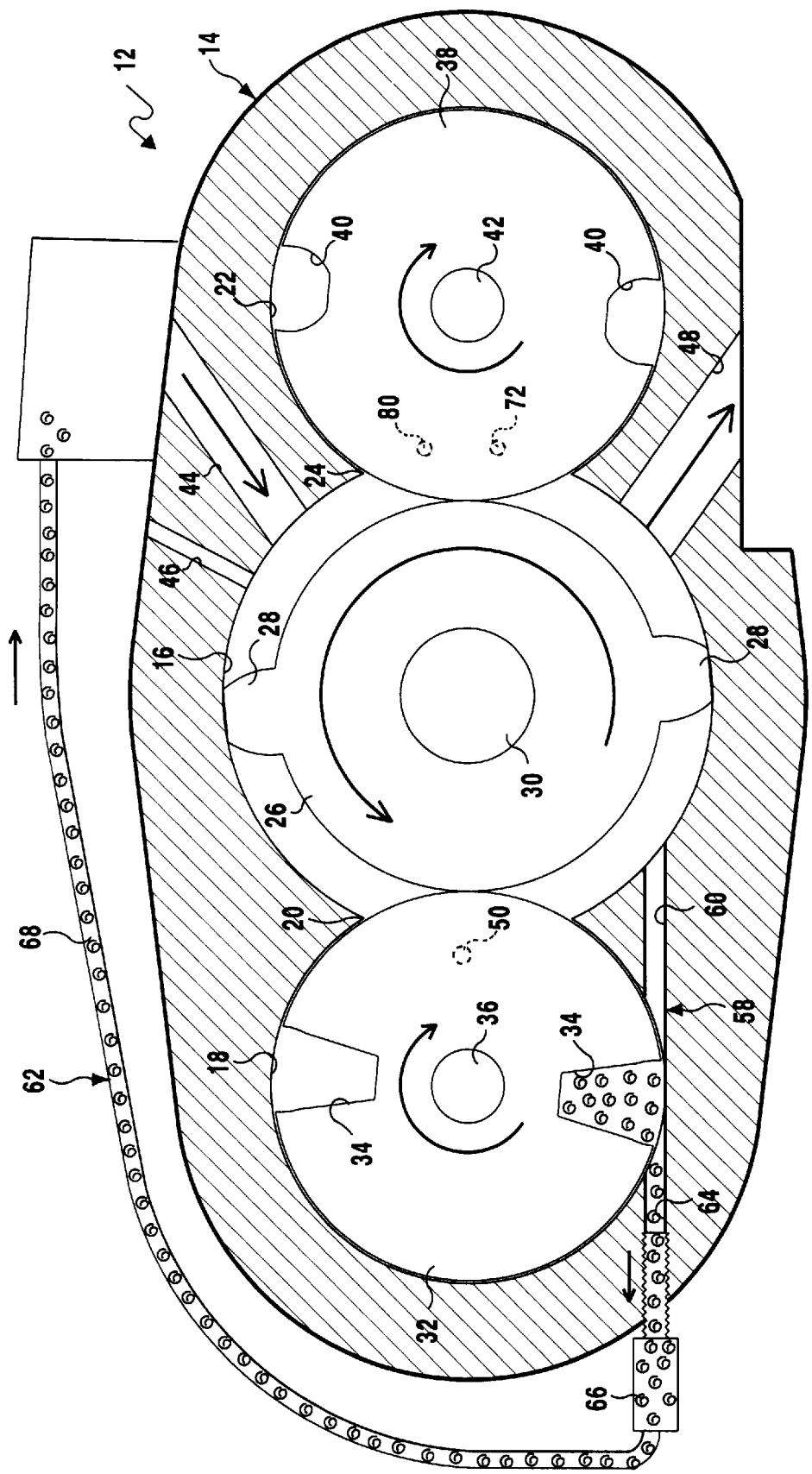
FIG. 7 is a diagrammatic cross sectional view similar to FIG. 6, showing the position of the rotors at the beginning of the exhaust gases recycling function.
Figure 8:
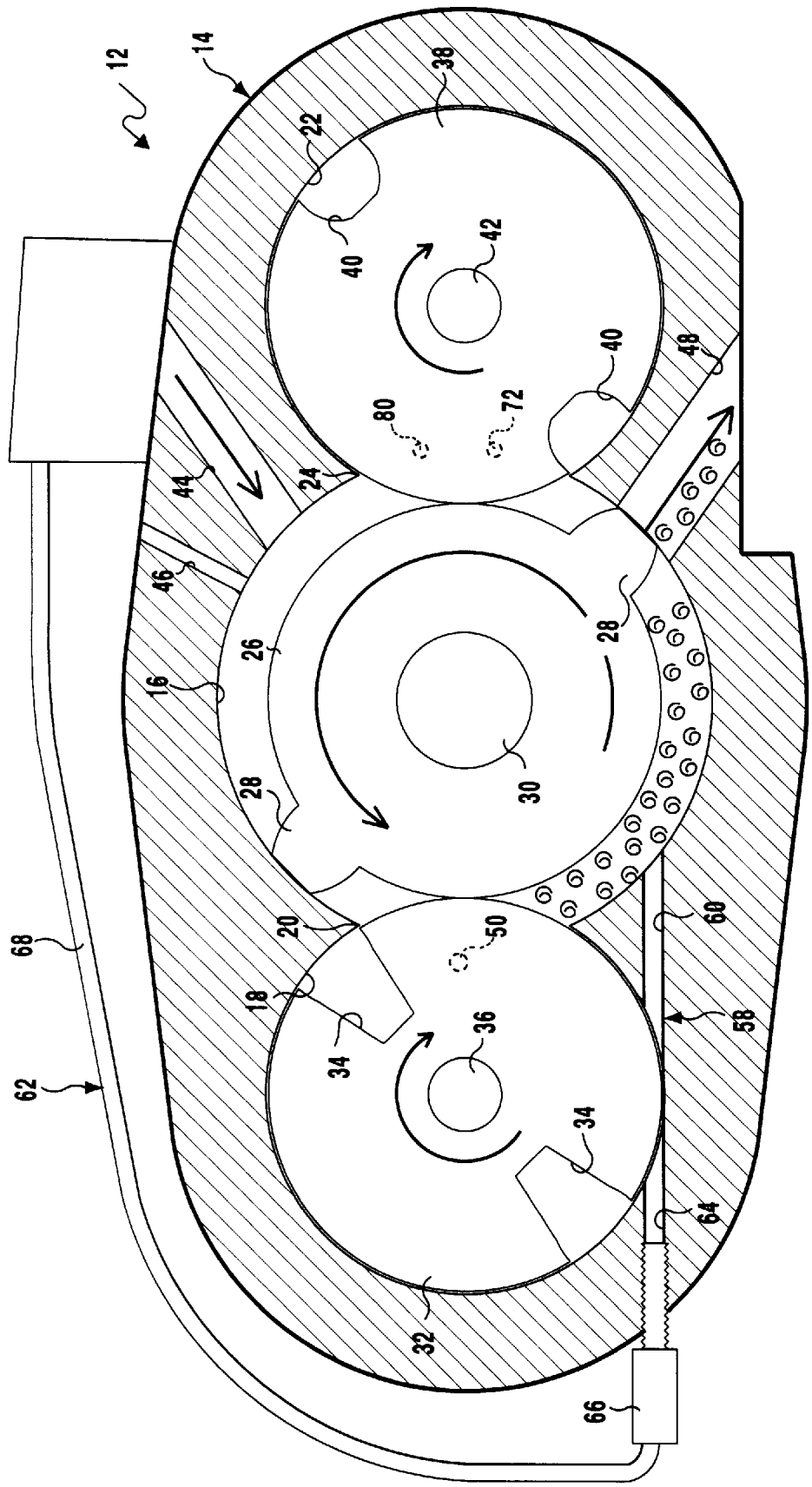
FIG. 8 is a diagrammatic cross sectional view similar to FIG. 7, showing the position of the rotors at the beginning of the exhaust cycle.
Figure 9:
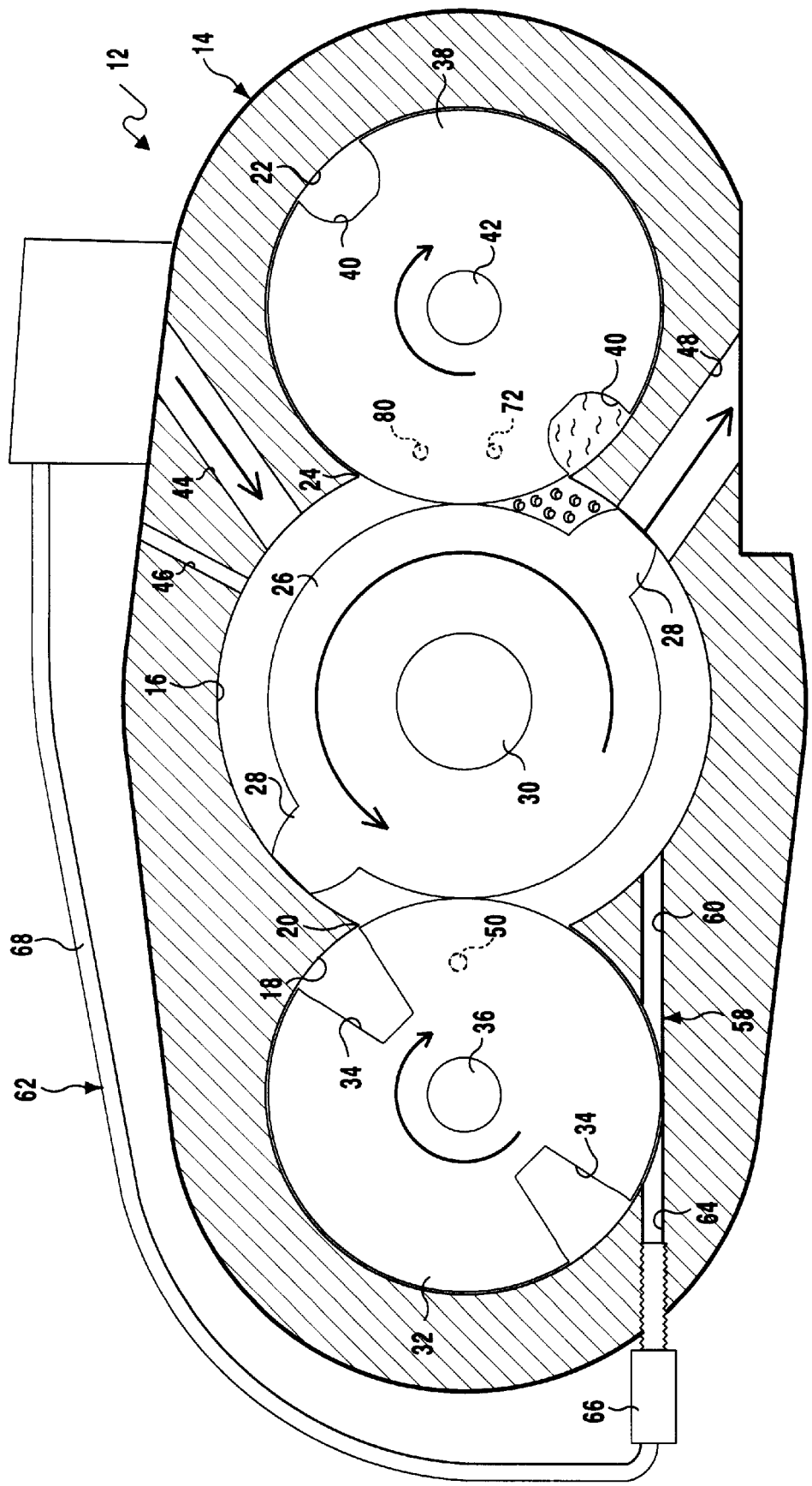
FIG. 9 is a diagrammatic cross sectional view similar to FIG. 8, showing the position of the rotors before the beginning of the scavenger pump function.

The improvement further comprises an assemblage 62 for purging any remaining exhaust gases from the cavity 34 of the second rotor 32 in the second well 18 back into the air intake port 44 (see FIG. 7). The purging assemblage 62 consists of the housing 14 having a plurality of exhaust gases recycling ports 64 communicating between the second well 18 and the exterior of the housing 14, and are in alignment with the expansion exchange tubes 60. A plurality of exhaust recycling solenoids 66 are provided. Each of the solenoids 66 are fluidly connected into one of the exhaust gases recycling ports 64 and is electrically controlled by a remote computer (not shown). A plurality of exhaust gases recycling tubes 68 are also provided. Each of the tubes 68 is fluidly connected between one of the solenoids 66 and the air intake port 44.

The improvement further contains an assembly 70 for ejecting the compression of any fresh air and trapped exhaust gases into the exhaust port 48 during the meshing of the piston 28 on the first rotor 26 with the cavity 40 in the third rotor 38. The ejecting assembly 70 includes the housing 14 having a scavenger pump exhaust port 72, that communicates with the third well 22 adjacent the second side 24 of the first center well 16.

Figure 10:
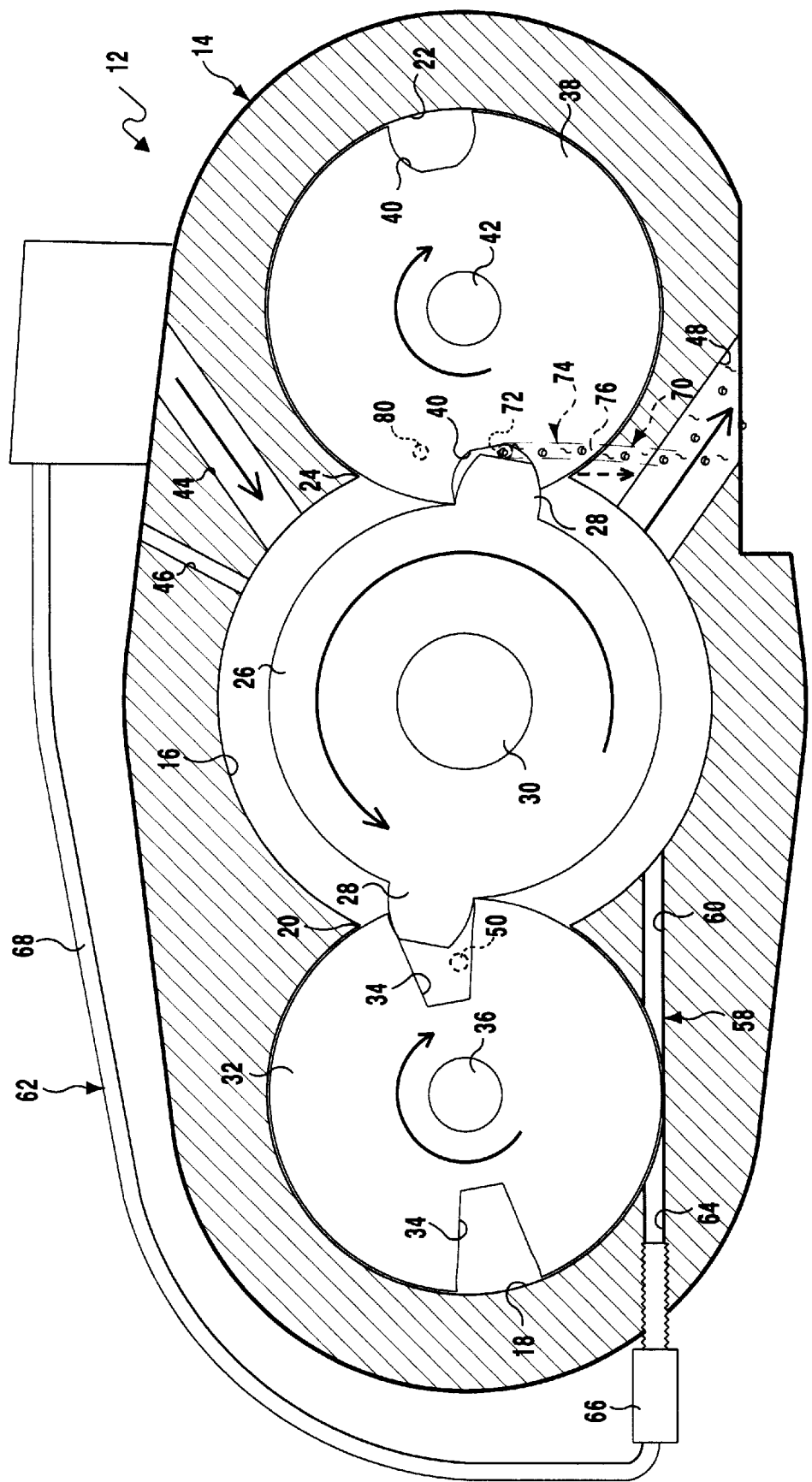
FIG. 10 is a diagrammatic cross sectional view similar to FIG. 9, showing the position of the rotors at the start of the scavenger pump function.

A conduit 74 communicates between the scavenger pump exhaust port 72 and the exhaust port 48 (see FIGS. 1 and 10). The conduit 74 is a scavenger pump exhaust tube 76 on an exterior surface of the housing 14.

Figure 11:
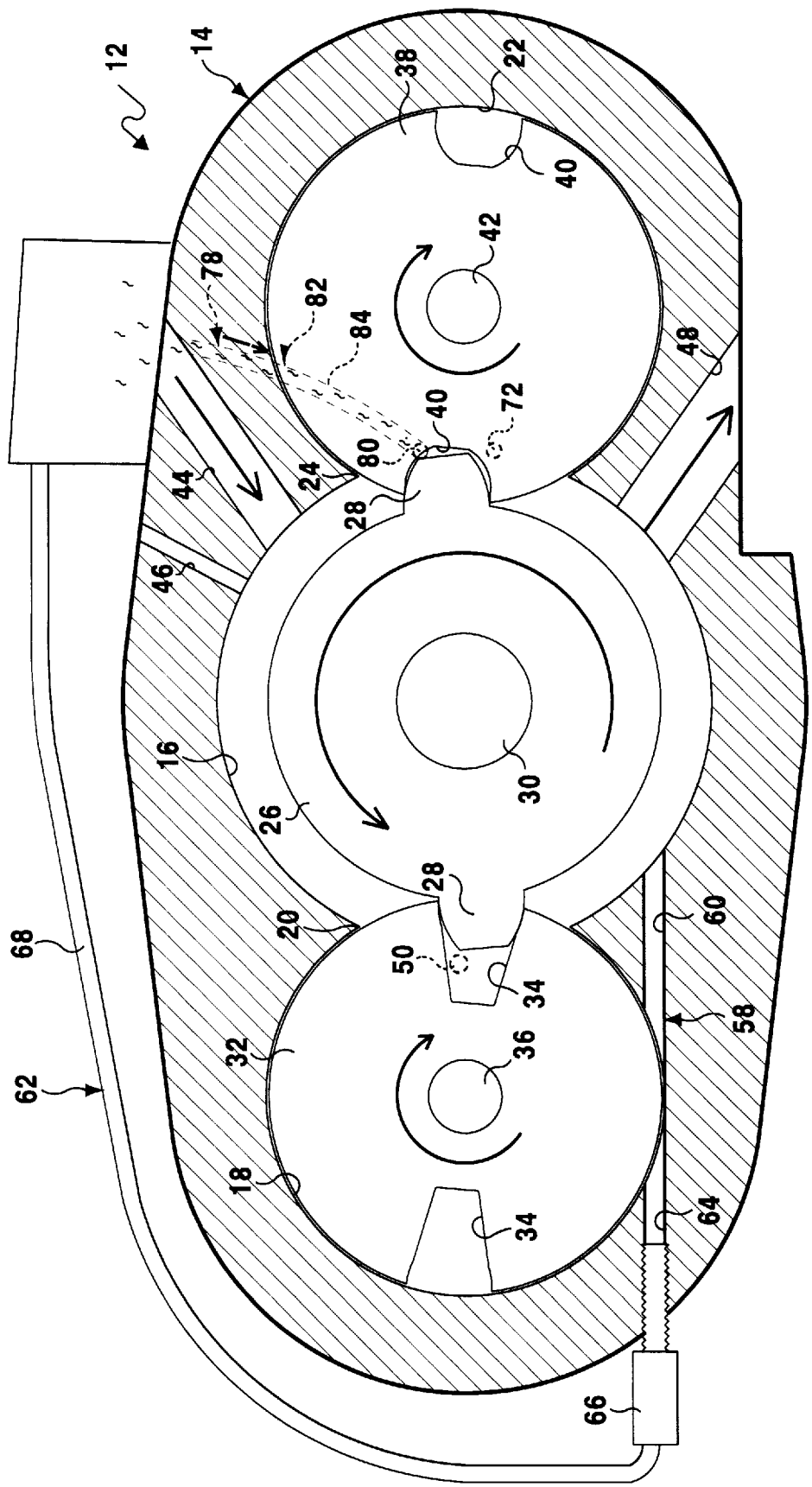
FIG. 11 is a diagrammatic cross sectional view similar to FIG. 10, showing the position of the rotors at the final stage of a complete cycle of the engine during the scavenger pump function.

The improvement further comprises a unit 78, for drawing fresh air from the air intake port 44 into the cavity 40 in the third rotor 38, when the piston 28 of the first rotor 26 starts to exit from the cavity 40 in the third rotor 38 (see FIGS. 1 and 11). The drawing unit 78 consists of the housing 14 having a scavenger pump intake port 80, that communicates with the third well 22 adjacent the second side 24 of the first center well 16 above the scavenger pump exhaust port 72. A conduit 82 communicates between the scavenger pump intake port 80 and the air intake port 44. The conduit 82 is a scavenger pump intake tube 84 on the exterior surface of the housing 14.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In an improved rotary engine of the type having a housing with a first center well, a secondary well communicating with a first side of the first center well and a third well communicating with a second side of the first center well, a first rotor with two evenly spaced apart pistons on a first output shaft rotatably mounted in the first center well, a second rotor having two evenly spaced apart cavities on a second alignment shaft rotatably mounted in the second well, a third rotor having two evenly spaced apart cavities on a third alignment shaft rotatably mounted in the third well, an air intake port in the housing communicating with the first center well adjacent to the second side thereof, a fuel injection port in the housing communicating with the first center well adjacent to the air intake port, an exhaust port communicating with the first center well adjacent to the second side thereof opposite from the air intake port, a fuel firing spark plug communicating with said second well adjacent to the first side of the first center well and three gears for operatively connecting the three shafts together for holding the pistons of the first rotor in the first center well in mesh with the cavities in the second and third rotors, wherein the improvement comprises:

means for transferring any remaining exhaust gases from the first center well into a cavity of the second rotor in the second well during the expansion cycle
   a) said transferring means includes a plurality of expansion exchange tubes in the housing communicating between the first center well and the second well on the first side opposite from the air intake port; and
   b) means for purging any remaining exhaust gases from the cavity of the second rotor in the second well back into the air intake port.

2. In an improved rotary engine as recited in claim 1, wherein said purging means includes:
   a) the housing having a plurality of exhaust gas recycling ports communicating between the second well and the exterior of the housing and being in alignment with said expansion exchange tubes;
   b) a plurality of exhaust gases recycling solenoids, whereby each of said solenoids is fluidly connected into one of said exhaust gases recycling ports and electrically controlled by a remote computer; and
   c) a plurality of exhaust gases recycling tubes, whereby each of said tubes is fluidly connected between one of said solenoids and the air intake port.

3. In an improved rotary engine as recited in claim 1, wherein the improvement further comprises means for ejecting the compression of any fresh air and trapped exhaust gases into the exhaust port during the meshing of the piston on the first rotor with the cavity in the third rotor.

4. In an improved rotary engine as recited in claim 3, wherein said ejecting means includes:
   a) said housing having a scavenger pump exhaust port communicating with the third well adjacent the second side of the first center well; and
   b) a conduit communicating between said scavenger pump exhaust port and the exhaust port.

5. In an improved rotary engine as recited in claim 4, wherein said conduit is a scavenger pump exhaust tube on an exterior surface of the housing.

6. In an improved rotary engine as recited in claim 4, wherein the improvement further comprises means for drawing fresh air from the air intake port into the cavity in the third rotor when the piston of the first rotor starts to exit from the cavity in the third rotor.

7. In an improved rotary engine as recited in claim 6, wherein said drawing means includes:
   a) said housing having a scavenger pump intake port communicating with the third well adjacent the second side of the first center well adjacent said scavenger pump exhaust port; and
   b) a conduit communicating between said scavenger pump intake port and the air intake port.

8. In an improved rotary engine as recited in claim 7, wherein said conduit is a scavenger pump intake tube on an exterior surface of the housing.

9. In an improved rotary engine of the type having a housing with a first center well, a second well communicating with a first side of the first center well and a third well communicating with a second side of the first center well, a first rotor with two evenly spaced apart pistons on a first output shaft rotatably mounted in the first center well, a second rotor having two evenly spaced apart cavities on a second alignment shaft rotatably mounted in the second well, a third rotor having two evenly spaced apart cavities on a third alignment shaft rotatably mounted in the third well, an air intake port in the housing communicating with the first center well adjacent to the second side thereof, a fuel injection port in the housing communicating with the first center well adjacent to the air intake port, an exhaust port communicating with the first center well adjacent to the second side thereof opposite from the air intake port, a fuel firing spark plug communicating with said second well adjacent to the first side of the first center well and three gears for operatively connecting the three shafts together for holding the pistons of the first rotor in the first center well in mesh with the cavities in the second and third rotors, wherein the improvement comprises:
   a) means for transferring any remaining exhaust gases from the first center well into a cavity of the second rotor in the second well during the expansion cycle;
   b) said transferring means includes a plurality of expansion exchange tubes in the housing communicating between the first center well and the second well on the first side opposite from the air intake port; and c) means for purging any remaining exhaust gases from the cavity of the second rotor in the second well back into the air intake port.

10. In an improved rotary engine as recited in claim 9, wherein said purging means includes:

a) the housing having a plurality of exhaust gases recycling ports communicating between the second well and the exterior of the housing and being in alignment with said expansion exchange tubes;

b) a plurality of exhaust gases recycling solenoids, whereby each of said solenoids is fluidly connected into one of said exhaust gases recycling ports and electrically controlled by a remote computer; and c) a plurality of exhaust gases recycling tubes, whereby each of said tubes is fluidly connected between one of said solenoids and the air intake port.

11. In an improved rotary engine as recited in claim 10, wherein the improvement further comprises means for ejecting the compression of any fresh air and trapped exhaust gases into the exhaust port during the meshing of the piston on the first rotor with the cavity in the third rotor.

12. In an improved rotary engine as recited in claim 11, wherein said ejecting means includes:

a) said housing having a scavenger pump exhaust port communicating with the third well adjacent the second side of the first center well; and b) a conduit communicating between said scavenger pump exhaust port and the exhaust port.

13. In an improved rotary engine as recited in claim 12, wherein said conduit is a scavenger pump exhaust tube on an exterior surface of the housing.

14. In an improved rotary engine as recited in claim 13, wherein the improvement further comprises means for drawing fresh air from the air intake port into the cavity in the third rotor when the piston of the first rotor starts to exit from the cavity in the third rotor.

15. In an improved rotary engine as recited in claim 14, wherein said drawing means includes:

a) said housing having a scavenger pump intake port communicating with the third well adjacent the second side of the first center well adjacent said scavenger pump exhaust port; and b) a conduit communicating between said scavenger pump intake port and the air intake port.

16. In an improved rotary engine as recited in claim 15, wherein said conduit is a scavenger pump intake tube on an exterior surface of the housing.

* * * * *